US012340559B2

(12) United States Patent
Wu et al.

(10) Patent No.: US 12,340,559 B2
(45) Date of Patent: Jun. 24, 2025

(54) TRAINING AN OBJECT CLASSIFIER WITH A KNOWN OBJECT IN IMAGES OF UNKNOWN OBJECTS

(71) Applicant: ObjectVideo Labs, LLC, Tysons, VA (US)

(72) Inventors: Yuanwei Wu, McLean, VA (US); Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 379 days.

(21) Appl. No.: 17/903,484

(22) Filed: Sep. 6, 2022

(65) Prior Publication Data

US 2023/0081909 A1 Mar. 16, 2023

Related U.S. Application Data

(60) Provisional application No. 63/244,911, filed on Sep. 16, 2021.

(51) Int. Cl.
*G06T 7/20* (2017.01)
*G06K 9/00* (2022.01)
*G06V 10/764* (2022.01)
*G06V 10/771* (2022.01)
*G06V 10/776* (2022.01)

(52) U.S. Cl.
CPC .......... *G06V 10/764* (2022.01); *G06V 10/771* (2022.01); *G06V 10/776* (2022.01)

(58) Field of Classification Search
CPC .......... G06F 8/211; G06K 9/00; G06V 40/172
USPC ........ 382/100, 103, 106–107, 118, 156, 162, 382/159, 168, 181, 199, 224, 219, 254, 382/260, 274, 305, 312; 378/107, 144, 378/155
See application file for complete search history.

(56) References Cited

U.S. PATENT DOCUMENTS 8,559,684 B1 10/2013 Nechyba
10,268,950 B2 4/2019 Yin et al.
(Continued)

OTHER PUBLICATIONS

International Preliminary Report on Patentability in International Appln. No. PCT/US2022/075978, mailed on Mar. 28, 2024, 6 pages.
(Continued)

*Primary Examiner* — Seyed H Azarian
(74) *Attorney, Agent, or Firm* — Fish & Richardson P.C.

(57) ABSTRACT

Methods, systems, and apparatus, including computer programs encoded on computer storage media, for objection classification. One of the methods includes: obtaining a first set of images of objects that have a likelihood of being at a property that satisfies a likelihood threshold; generating, for each object, a binary classifier from a set of images of the respective object; determining, using at least one of the binary classifiers, that an image of an unknown object was classified as an object from the objects; in response to determining, using the binary classifiers, that the image of the unknown object was classified as an object from the objects, selecting a second set of images of unknown objects that does not include the image; and generating a multiclass classifier for use classifying objects using i) the first set as respective classes and ii) the second set that does not include the image.

20 Claims, 3 Drawing Sheets

(56) References Cited

U.S. PATENT DOCUMENTS

| | | | |
|---|---|---|---|
| 11,200,454 B1 | 12/2021 | Qian et al. | |
| 2004/0179719 A1* | 9/2004 | Chen | G06F 18/214 |
| | | | 382/118 |
| 2006/0177110 A1 | 8/2006 | Imagawa et al. | |
| 2007/0297650 A1 | 12/2007 | Rabinovich et al. | |
| 2009/0210362 A1 | 8/2009 | Xiao et al. | |
| 2010/0329517 A1 | 12/2010 | Zhang et al. | |
| 2011/0135166 A1 | 6/2011 | Wechsler et al. | |
| 2015/0110387 A1* | 4/2015 | Lienhart | G06F 18/211 |
| | | | 382/159 |
| 2016/0117571 A1 | 4/2016 | Othmezouri et al. | |
| 2016/0314380 A1 | 10/2016 | Abdulkader et al. | |
| 2018/0247161 A1 | 8/2018 | Cowan | |
| 2019/0012525 A1* | 1/2019 | Wang | G06V 40/172 |
| 2021/0133462 A1* | 5/2021 | Roberts | G06F 18/214 |
| 2021/0397823 A1* | 12/2021 | Zhang | G06F 18/22 |
| 2022/0300557 A1* | 9/2022 | Basu | G06F 16/9027 |
| 2023/0044233 A1 | 2/2023 | Wu et al. | |

OTHER PUBLICATIONS

PCT International Search Report and Written Opinion in International Appln. No. PCT/US2022/075978, mailed on Nov. 22, 2022, 7 pages.

* cited by examiner

TRAINING AN OBJECT CLASSIFIER WITH A KNOWN OBJECT IN IMAGES OF UNKNOWN OBJECTS

CROSS-REFERENCE TO RELATED APPLICATION

This application claims the benefit of U.S. Provisional Application No. 63/244,911, filed on Sep. 16, 2021, the contents of which are incorporated by reference herein.

TECHNICAL FIELD

This disclosure application relates generally to monitoring systems, for example, to detect faces, vehicles, animals, people without using a face, or other objects of interest.

BACKGROUND

Object classifiers can be trained to recognize objects as certain classes in pictures. The efficacy of object classifiers can depend on, among other things, the data used for training.

SUMMARY

Techniques are described for training a face classifier with a known person, e.g., a resident, in images of unknown person, e.g., strangers. Images, or alternatively a set of images, of unknown persons may refer to a set of people that are used as negative samples when training a classifier. A property monitoring system may perform facial recognition and automatically perform various actions based on whether a face is recognized. For example, the property monitoring system may determine that a person at the door step is a resident that lives at the property and, in response, automatically unlock a front door. In another example, the property monitoring system may determine that a person at the door step is not a resident and, in response, automatically alert a resident that a visitor is at the doorstep. In yet another example, the property monitoring system may send a notification to a user that his or her daughter or son has arrived home from school.

The property monitoring system may learn to recognize faces based on training on images of residents and images of unknown persons. For example, the property monitoring system can obtain five images of each resident of a property and five images of each unknown person in an unknown person set. From those images, the property monitoring system can learn to recognize whether a person in an image is one of the residents or an unknown person.

However, it may be possible that a person in the unknown person set is a resident. For example, the unknown person set may include a default set of real people that is used for training classifiers at thousands of different properties. Accordingly, the real people from which the unknown person set was generated may be in both the resident set and the unknown person set for properties in which the real people reside. Training a classifier with images of a resident as both positive and negative samples may result in a classifier that is unable to accurately classify the resident. For example, during training the classifier may yield incorrect predictions when an image of a resident is a negative sample and another image of the same resident is a positive sample.

Additionally, or alternatively, the unknown persons may include a person that looks very similar to the resident but is not the resident. A classifier trained with images of the very similar person as a negative sample and images of the resident as a positive sample can also result in a classifier that is unable to accurately classify the resident.

Accordingly, the system may initially train a binary classifier for each resident with only images of the residents at the property. The system may use the binary classifiers to ensure that images of the resident, or very similar looking people in the unknown person set, aren't used as negative samples in training a multiclass classifier that classifies people as the respective residents, or as an unknown person, and may then generate the multiclass classifier. The system can use the classifications made by the multiclass classifier to perform automatic actions at the property such as unlocking the front door, notifying residents of a visitor, and the like.

The system can train a classifier to recognize known or unknown objects in general. In some implementations, the objects include vehicles, animals, people, or a combination thereof In general, one innovative aspect of the subject matter described in this specification relates to generating multiclass identifiers, and can be embodied in methods that include the actions of: obtaining a first set of images of one or more objects, each of which has a likelihood of being at a property that satisfies a likelihood threshold; generating, for each object from the one or more objects each of which has a likelihood of being at a property that satisfies a likelihood threshold, a binary classifier from a set of images of the respective object; determining, using at least one of the binary classifiers, that an image of an unknown object of a plurality of unknown objects was classified as an object from the one or more objects, each of which has the respective likelihood of being at the property that satisfies the likelihood threshold; in response to determining, using at least one of the binary classifiers, that the image of the unknown object of the plurality of unknown objects was classified as an object from the one or more objects each of which has the respective likelihood of being at the property that satisfies the likelihood threshold, selecting a second set of images of unknown objects from the plurality of unknown objects that does not include the image; and generating a multiclass classifier for use classifying objects depicted in images of the property using i) the first set of images of the one or more objects as respective classes and ii) the second set of images of the unknown objects that does not include the image.

In general, one innovative aspect of the subject matter described in this specification relates to generating multiclass identifiers, and can be embodied in methods that include the actions of: obtaining a first set of images of the one or more objects, each of which has a likelihood of being at a property that satisfies a likelihood threshold; generating, for each object from the one or more objects each of which has a likelihood of being at a property that satisfies a likelihood threshold, a binary classifier from a set of images of the respective object; determining, using at least one of the binary classifiers, that an image of an unknown object of a plurality of unknown objects was classified as an object from the one or more objects, each of which has the respective likelihood of being at the property that satisfies the likelihood threshold; in response to determining, using at least one of the binary classifiers, that the image of the unknown object of the plurality of unknown objects was classified as an object from the one or more objects each of which has the respective likelihood of being at the property that satisfies the likelihood threshold, selecting a second set of images of unknown objects from the plurality of unknown objects that does not include the image; and generating a multiclass classifier for use classifying objects depicted in images of the property using i) the first set of images of one or more objects as respective classes and ii) the second set of images of the unknown objects that does not include the image.

The foregoing and other embodiments can each optionally include one or more of the following features, alone or in combination. In some implementations, selecting the second set of images includes selecting the second set of images of the unknown objects from the plurality of unknown objects that does not include any images of the object.

In some implementations, the one or more objects each of which has a likelihood of being at a property include one or more residents.

In some implementations, the actions further include obtaining images of multiple unknown objects, wherein selecting the second set of images includes selecting the second set of images from the images.

In some implementations, generating a multiclass classifier further includes using the first set of images as positive examples and the second set of images from the images of unknown persons as negative examples.

In some implementations, the one or more objects includes at least one of one or more people, one or more pets, or one or more vehicles.

In some implementations, the actions further include providing the multiclass classifier to a device for use in classifying objects as known objects.

In some implementations, the actions further include: validating at least one of the binary classifiers by determining at least one false positive within the positive sample from a confusion matrix for the at least one binary classifier; updating the first set of images by removing the at least one false positive from the first set of images; and generating a new multiclass classifier using i) the updated, first set of images of one or more objects as respective classes and ii) the second set of images of the unknown objects that does not include the image.

In some implementations, the plurality of unknown objects include objects for which a binary classifier is not associated at the property.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The above-noted aspects and implementations further described in this specification may offer several advantages. For example, the system may more accurately classify people at the property compared to other systems. In some examples, the system may use fewer images for training a classifier, reducing computer processing, memory usage, or both, compared to other systems. In some implementations, the systems and methods described in this specification can recognize known or unknown objects more quickly, reducing an amount of time a known or an unknown object spends at a property before being recognized compared to other systems. This can result in a system or method more quickly performing an automated action given the object, e.g., triggering the opening of a gate for a familiar vehicle, more quickly alerting residents of a property to an unknown object, or both. In some implementations, by recognizing objects more quickly, the systems and methods described in this specification can proactively identify and engage would-be strangers or intruders before they can threaten physical property, reducing risk to a property.

In some implementations, the systems and methods described in this specification can use clustering as part of a recognition framework to reduce an amount of time for the enrollment process, e.g., creating a group of known objects, and provide high-quality images to train the multi-classes classifier for recognition The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1:
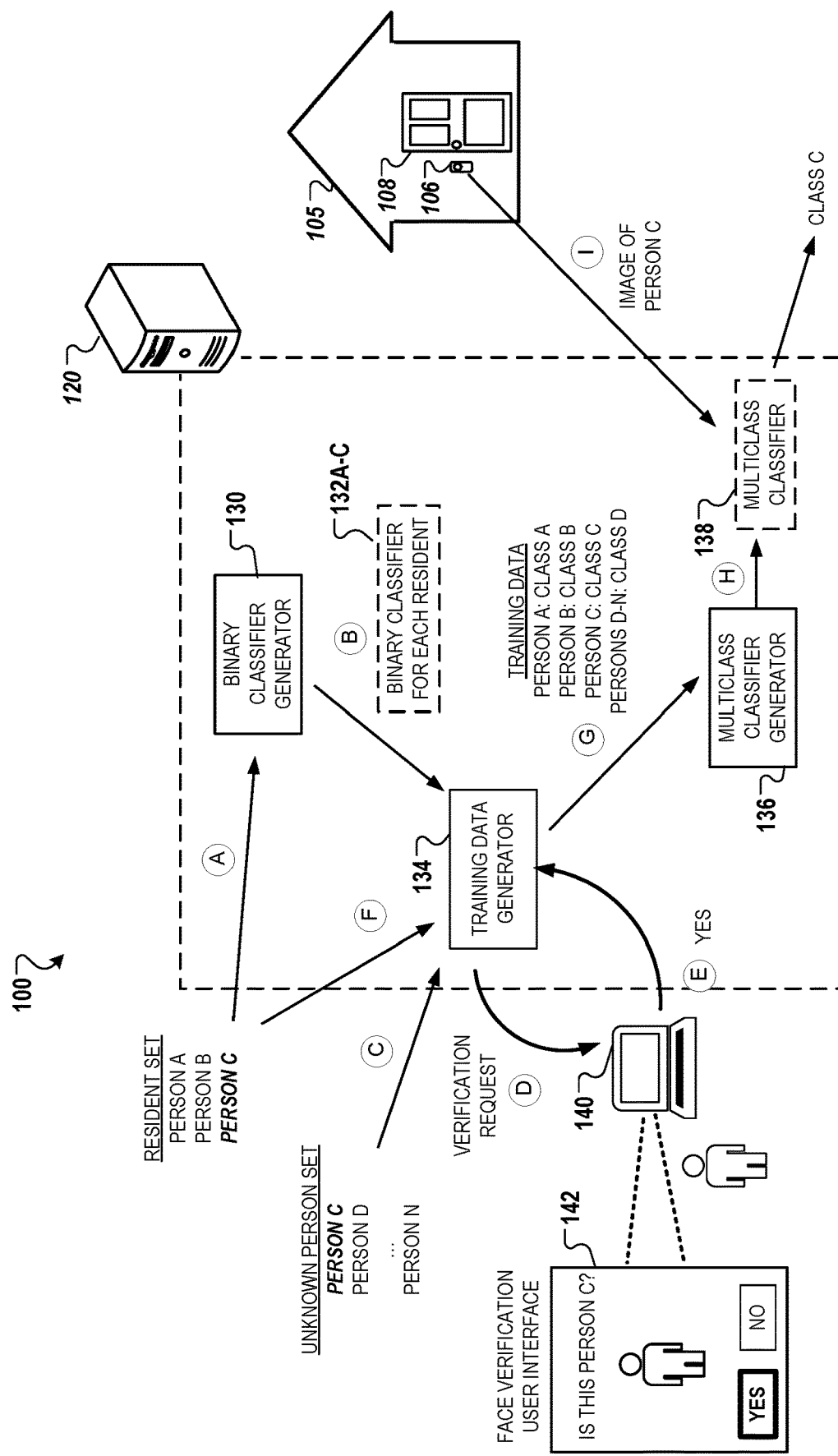
FIG. 1 illustrates an example block diagram of a system for training an object classifier with a known object in an unknown object set.

FIG. 1 illustrates an example block diagram of a system 100 for training an object classifier with a known object, e.g., a resident, in an unknown object set. The system 100 includes a camera 106 at a property 105 that captures images of residents at the property 105, a server 120 that generates a multiclass classifier 138 from the images of residents at the property 105 and an unknown person set, and a user device 140 used to verify whether a person in the unknown person set is a resident.

The camera 106 may be a video/photographic camera or other type of optical sensing device configured to capture images of objects at the property 105. For example, the camera 106 may be a doorbell camera located next to a front door 108 of the property 105. In another example, the camera 106 may be a camera that is separate from the doorbell that is located above the front door 108 and has a view of humans, vehicles, and animals approaching the front door 108.

The camera 106 may capture images of people at the property 105 and provide the images to the server 120. For example, the camera 106 may capture images of persons A, B, and C at the property 105. The images of the people may be used to generate a known person, e.g., a resident set that includes multiple residents with respective, images of each resident labeled by the residents. For example, the resident set may include twenty images of person A captured by the camera 106, twenty five images of person B captured by the camera 106, and thirty images of person C captured by the camera 106.

The resident set may refer to a set of people that a classifier is trained to recognize. In some implementations, the resident set may be limited to people that live at the property 105. For example, the system 100 may learn which people routinely sleep at the property 105. In alternate implementations, the resident set may include persons that the system 100 is to learn to recognize, whether or not the person lives at the property 105. For example, a user may specify which persons are to be included in the resident set, such as friends or babysitters.

The server 120 may be one or more computing devices. For example, the server 120 may be a computer that is remote from the property 105 and in communication with the camera 106 through a wide area network. The server 120 includes a binary classifier generator 130, a training data generator 134, and a multiclass classifier generator 136.

The binary classifier generator 130 may obtain the resident set. For example, as shown in stage A, the resident set may include persons A, B, and C as described above. The binary classifier generator 130 may generate a binary classifier 132A-C for each of the residents based on the resident set. For example, as shown in stage B, the binary classifier generator 130 may generate a first binary support vector machine (SVM) that classifies whether an image is of person A or not of person A, generate a second binary SVM that classifies whether an image is of person B or not of person B, and generate a third binary SVM that classifies whether an image is of person C or not of person C.

The binary classifier generator 130 may generate each of the binary classifiers, e.g., binary SVM, using images of the respective resident as positive samples and images of the other residents as negative samples. For example, the binary classifier generator 130 may generate the first binary classifier 132A for person A based on using images of person A as positive samples and images of persons B and C as negative samples, generate the second binary classifier 132B for person B based on using images of person B as positive samples and images of persons A and C as negative samples, and generate the third binary classifier 132C for person C based on using images of person C as positive samples and images of persons A and B as negative samples. The images may be representations of persons in the form of a JPEG file, a GIF file, feature embedding generated from images, and the like.

The training data generator 134 may obtain the binary classifiers, an unknown person set, and the resident set from which the binary classifiers were generated, and generate training data for the multiclass classifier generator 136. For example, the training data generator 134 may obtain three binary classifiers 132A-C that were trained from images of persons A, B, and C, obtain an unknown person set, as shown in stage C, that includes persons C-N, obtain, as shown in stage F, the resident set of persons A, B, and C, and, as shown in stage G, generate training data that includes images of persons A-C labeled with classes A-C, respectively, and images of persons D-N labeled as a negative class D.

The training data generator 134 may obtain the unknown person set from storage. For example, the unknown person set may be a stored set of default persons that are used for multiple different properties as examples of people that are not residents of the properties, and the unknown person set may be generated based on images of persons captured at an initial set of properties and then stored for later use in training a classifier for specific properties.

The training data generator 134 may use the binary classifiers to identify persons in the unknown person set that appear similar to residents in the resident set. For example, the training data generator 134 may use the first binary classifier 132A and determine that no person in the unknown person set is classified as person A, use the second binary classifier 132B and determine that no person in the unknown person set is classified as person B, and use the third binary classifier 132C and determine that person C in the unknown person set is classified as person C in the resident set.

In some implementations, a known object has a likelihood of being at a property that satisfies a likelihood threshold. In some implementations, an unknown object does not have an associated binary classifier at the property. For example, a resident can have a high likelihood of being at a property 105 that satisfies a threshold. As another example, the server 120 can lack an associated binary classifier for a car that has never visited the property 105 before.

The training data generator 134 may use the binary classifiers 132A-C to identify persons in the unknown person set that appear similar to residents in the resident set by providing each image of a person in the unknown person set to all the binary classifiers 132A-C as an input and receiving, as an output, a classification from each binary classifier. For example, the training data generator 134 can provide a first image of person C from the unknown person set in parallel to each of the binary classifiers 132A-C and receive a negative output from binary classifier 132A, negative output from binary classifier 132B, and positive output from binary classifier 132C. In another example, the training data generator 134 may provide a second image of person D from the unknown person set in parallel to each of the binary classifiers 132A-C and receive a negative output from each of binary classifiers 132A-C.

In response to determining that an image of an unknown person was classified as a resident, the training data generator 134 can provide a verification request to the user device 140 for display in a face verification user interface 142. A user can verify whether the unknown person classified as a resident is the resident, and the user device 140 can send the verification to the training data generator 134. For example, in response to determining with the binary classifier for resident C that a classification for an image of person C from the unknown person set is positive, the training data generator 134 may, as shown in stage D, provide the image of person C from the unknown person set that was classified as person C from the resident set to the user device 140 in the face verification user interface 142, along with a prompt of "Is this person C," and, as shown in stage E, and receive back a response of "Yes."

In another example, in response to determining with the binary classifier for resident C that a classification for an image of person D from the unknown person set is negative, the training data generator 134 can skip providing the image of person D from the unknown person set. In yet another example, in response to determining with the binary classifier for resident C that a classification for an image of person E from the unknown person set is positive, the training data generator 134 can provide the image of person E from the unknown person set that was classified as person C from the resident set to the user device 140, along with a prompt of "Is this person C," and receive back a response of "No."

The training data generator 134 can receive the response from the user device 140 and generate training data for the multiclass classifier generator 136. For example, based on a response that verifies that person C in the unknown person set is person C in the resident set, the training data generator 134 can generate the training data that includes images of persons A-C labeled with classes A-C, respectively, and images of persons D-N labeled as a negative class D, and not include images from the unknown person set for person C. In another example, based on a response that verifies that person E in the unknown person set is not person C in the resident set, the training data generator 134 can generate the training data that includes images of persons A-C labeled with classes A-C, respectively, and images of persons E and other persons in the unknown person set labeled as a negative class D.

The training data generator 134 may generate the training based on removing persons in the unknown person set verified as known persons, e.g., residents, and then select remaining persons from the unknown person set as negative samples. For example, the training data generator 134 can remove person C from the unknown person set, and then select remaining unknown persons from the unknown person set as negative samples.

In this specification, selecting an image and selecting an object corresponding to an image can be used interchangeably. Further, an image with an object with a personal attribute can be used interchangeably with an object with a personal attribute.

In some implementations, the training data generator 134 can select unknown objects based on a personal attribute. For example, the training data generator 134 may, for each resident, determine a type of a personal attribute of the resident and then randomly select five unknown persons with that same type of personal attribute and randomly select five unknown persons of with a different type of that personal attribute, and for each of the selected unknown persons, include in the training data five or more images of the unknown person. The training data generator 134 may determine the personal attribute based on one or more of user input of a personal attribute for each resident, stored labels of personal attributes for each unknown person, and automatic visual classification of personal attribute from images. In some implementations, the training data generator 134 may iteratively select the unknown persons for each resident so that selected unknown persons are removed from the unknown person set and no unknown person is included as a negative sample for multiple residents.

In some implementations, the training data generator 134 can select unknown persons randomly, e.g., not based on personal attributes of the known or unknown persons. In these implementations, the negative sample will include randomly selected unknown persons.

In some implementations, the training data generator 134 can refine the negative sample, e.g., set of selected unknown persons. For example, the positive sample can include images of residents of a particular property. The training data generator 134 can validate the binary classifiers associated with each resident by plotting the confusion matrix, e.g., identify false positives when the multiclass classifier 138 mistakes an unknown person with a resident. The training data generator 134 can remove the images of unknown people that are mistaken for a resident. The training data generator 134 can iterate this process a few, e.g., two or three, times before determining the final, refined negative sample.

In some implementations, the training data generator 134 can select unknown persons using multiple personal attributes. For example, the training data can include the positive sample, e.g., images of residents, and the negative sample, e.g., selected images of unknown people. The negative sample can include a combination of unknown persons having similar and dissimilar personal attributes compared to a resident. In some implementations, there can be more images in the negative sample than in the positive sample, e.g., ten images of unknown people per resident. The training data generator 134 can randomly select a number, e.g., five, of images of unknown persons to form a first group. For each image of an unknown person, the training data generator 134 can select a predetermined number, e.g., five, of images from the negative sample that depict an unknown person with the same, shared personal attribute of each selected, unknown person. The training data generator 134 can select a predetermined number, e.g., five, of images of unknown persons that do not share that same personal attribute, forming a second group. The unknown people in the second group can have both similar and dissimilar traits for a second type of personal attribute. The negative sample for the training data can be the combination of the first and second group. The training data having multiple binary classifiers allows the multiclass classifier generator 136 to perform multiclass-SVM training.

In some implementations, the number of unknown persons in the first group N can depend on the number of unknown persons with a shared personal attribute as a resident, e.g., $N_1$. In some examples, the number of unknown persons with a shared personal attribute as a resident $N_1=3$. In some implementations, the number of unknown persons in the first group depends on the number of unknown persons with different personal attributes as a resident, e.g., $N_2$. In some examples, the number of unknown persons with different personal attributes as a resident $N_2=2$. In some implementations, the number of unknown persons in the first group depends on a predetermined number of images, $N_3$, selected for each of the selected unknown person, e.g., $N_3=5$. Using these example numbers, the first group of unknown persons could be equal to a combination, e.g., the sum, of the unknown person in each of the groups, e.g., unknown persons with either shared or different personal attributes, times the predetermined number of images selected for each unknown person, e.g., $N=N_3*(N_1+N_2)=25$ images corresponding to five unknown persons.

The multiclass classifier generator 136 can receive the training data from the training data generator 134 and generate a multiclass classifier 138. For example, the multiclass classifier generator 136 may receive the training data that includes images of persons A-C labeled with classes A-C, respectively, and images of persons D-N labeled as a negative class D, and then generate, as shown in stage H, the multiclass classifier 138, which can receive an image and classify the image as either of class A, class B, class C, or class D, where class A corresponds to person A, class B corresponds to person B, class C corresponds to person C, and class D corresponds to a unknown person.

The multiclass classifier 138 can then be used to recognize whether a person at the property is a known person. For example, the multiclass classifier 138 may, as shown in stage I, receive an image of person C captured by the camera 106 as an input and output a classification as positive. In response, the system 100 can then perform automated actions such as unlocking a door based on that positive output. In some implementations, the multiclass classifier 138 can be stored on the server or provided to the camera 106 so the camera 106 can make classifications. In some implementations, the multiclass classifier 138 can be provided to a control unit in a property so that the control unit may receive images from the camera 106 and make classifications.

In some implementations, the multiclass classifier 138 can use multiclass SVM inference to determine whether an image includes a known or unknown object. The multiclass classifier 138 can receive an image including a person captured by camera 106. Then the multiclass classifier 138 can determine if the image including a person captured by camera 106 corresponds to a subject of the positive classes, e.g., known persons. If the multiclass classifier 138 determines that the image does not correspond to any of the positive classes, the multiclass classifier 138 can determine the image corresponds to a negative class.

In some implementations, the multiclass classifier 138 can assign scores that correspond to the confidence in the prediction of an image including or not including a known or unknown person. For example, the multiclass classifier 138 can determine with 90% confidence that an image corresponds to a particular positive class, e.g., resident A. The multiclass classifier 138 can use a threshold score, e.g., a percentage, fraction, or other numerical value, to determine whether to assign an image to a positive or negative class. For example, if an image has a first score for a first positive class and a second score for second positive class, and both the first and second score are outside a threshold value, the multiclass classifier 138 can determine to assign the image to a negative class.

In some implementations, the system 100 can be trained to recognize object in general, such as human, animals, or vehicles. For example, the resident set may include images of dogs that reside at the property 105, and the unknown person set may include a default set of images of unknown person dogs, and the classifiers may be trained to recognize whether a dog is one shown in the resident set, e.g., the known set. As another example, the resident set can include images of vehicles that belong to residents of the property 105, and the unknown person set can include a default set of images of unknown person vehicles. The classifiers can be trained to recognize whether a vehicle is one shown in the resident set. In some implementations where the system 100 recognizes vehicles, the camera 106 can be a different type of camera than a doorbell camera and can have a field of view that includes one or more of a driveway, road frontage, or vehicle parking area.

In some implementations, the methods described herein of determining negative and positive samples for training data can lead to improved accuracy in prediction of known and unknown persons even when the set of images of unknown persons does not include an image of a known person.

Figure 2:
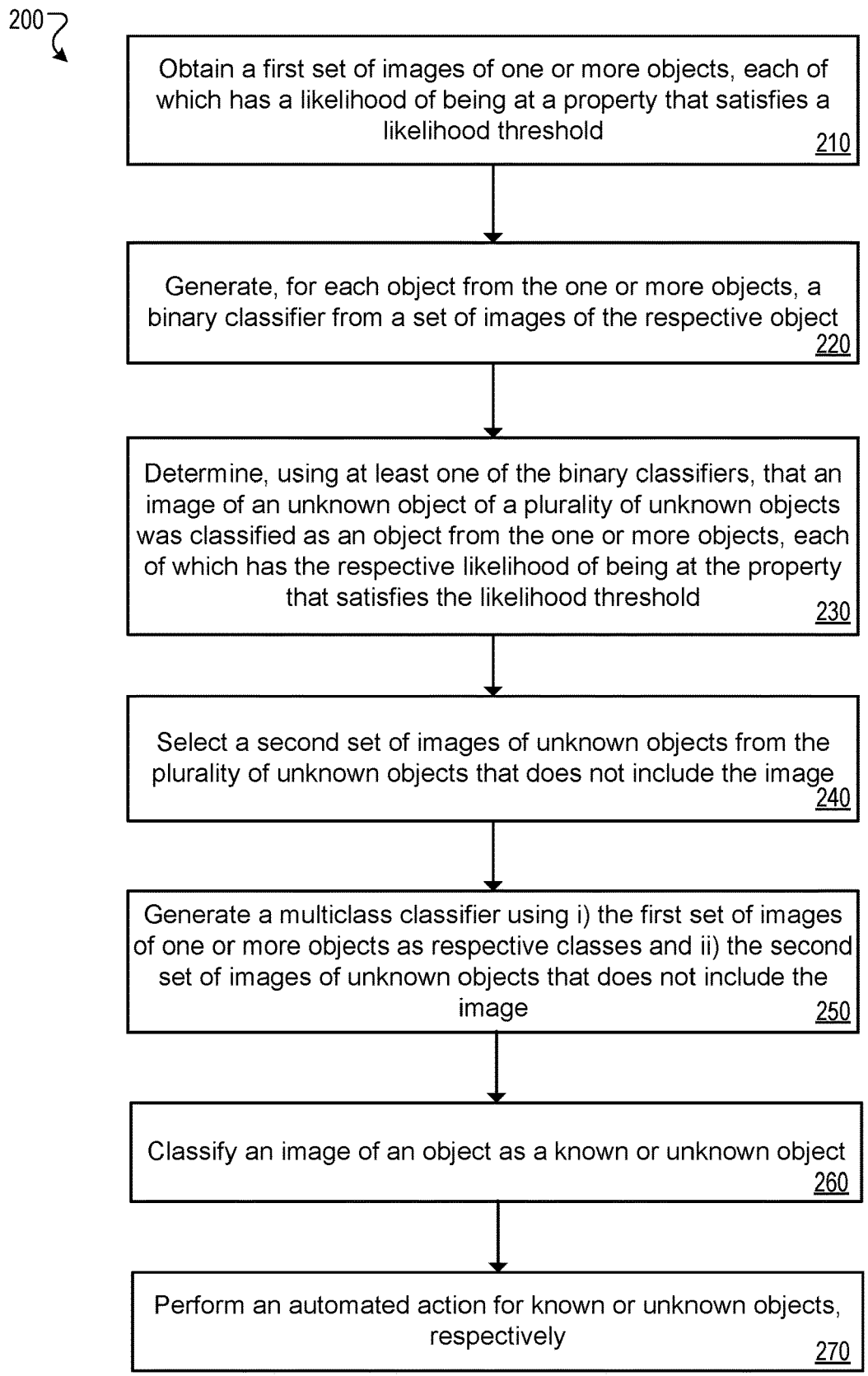
FIG. 2 is a flow diagram of an example process for training an object classifier with a known object in an unknown person object.

FIG. 2 is a flow diagram of an example process 200 for training an object classifier with a known object in an unknown object set. The process 200 can be implemented using the system 100 described above or some other system. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The training data generator 134 can obtain a first set of images of one or more objects, each of which has a likelihood of being at a property that satisfies a likelihood threshold (210). For example, the binary classifier generator 130 and the training data generator 134 can both obtain images of three residents captured by the camera 106, where each image is labeled as being of one of the three residents. In some implementations, the one or more objects can include at least one of people, pets, or vehicles.

The binary classifier generator 130 can generate, for each object from the one or more objects each of which has a likelihood of being at a property that satisfies a likelihood threshold, a binary classifier from a set of images of the respective object (220). For example, the binary classifier generator 130 can generate three binary SVMs, one binary SVM for each of three residents. In some implementations, the binary classifier generator 130 may generate a binary classifier with images of the respective resident as positive samples and the images of the other residents as negative samples. For example, fifteen images of person A may be used as positive samples, twenty images of person B, and twenty five images of person C as negative samples. In some implementations where there is only one resident to be recognized, the binary classifier generator 130 may generate a binary classifier with images of the resident as positive samples and images captured by the camera 106 of any other persons at the property 105 as the negative samples.

The training data generator 134 can determine, using at least one of the binary classifiers, that an image of an unknown object of a plurality of unknown objects was classified as an object from the one or more objects, each of which has the respective likelihood of being at the property that satisfies the likelihood threshold (230). For example, the training data generator may determine, using the binary SVM for person C in the resident set, that an image of person C in the unknown person set input resulted in a positive output.

The training data generator 134 can, in response to determining, using at least one of the binary classifiers, that an image of an unknown object of a plurality of unknown objects was classified as an object from the one or more objects each of which has the respective likelihood of being at the property that satisfies the likelihood threshold, select a second set of images of unknown objects from the multiple unknown objects that does not include the image (240). For example, the training data generator 134 may generate a set of training data that includes images of various the persons in the unknown person set but not including images of person C from the unknown person set as a negative class, and include images of the residents as respective other classes.

In some implementations, selecting the second set of images can include selecting the second set of images of unknown objects from the plurality of unknown objects that does not include any images of the object.

The multiclass classifier generator 136 can generate a multiclass classifier 138 using i) the first set of images of one or more objects as respective classes and ii) the second set of images of unknown objects that does not include the image (250). For example, the multiclass classifier generator 136 can generate the multiclass classifier that receives an image as input and outputs a classification of class A, class B, class C, or class D.

The multiclass classifier 138 can classify an image of an object as a known or unknown object (260). For example, the multiclass classifier 138 can recognize a vehicle A, B, or C as a known vehicle or any vehicle D-N as an unknown vehicle. In some implementations, an image can contain multiple objects, and the multiple objects can be of different types, such as an image of a person walking a dog. The multiclass classifier 138 can detect multiple objects of different types in an image as known or unknown objects, e.g., recognize a known person next to an unknown vehicle in one image.

The multiclass classifier 138 can determine a confidence score in the classification of the image of the object. For example, the multiclass classifier 138 can determine an 80% confidence score that an image corresponds to a known pet. In some implementations, the multiclass classifier 138 can determine confidence scores corresponding to more than one class. For example, the multiclass classifier 138 can determine a 50% confidence score that an image corresponds to a known vehicle A and a 50% confidence score that an image corresponds to a known vehicle B.

In response to classifying the object as a known object or unknown object, the system 100 can perform an automated action for known objects or unknown objects, respectively (270). In some implementations, the system 100 can unlock the front door 108 in response to classifying the object as a known resident. In some implementations, the system 100 can instruct the camera 106 to capture more pictures in response to the multiclass classifier 138 classifying the object as an unknown object. In some implementations, the system can perform an automated function when the multiclass classifier 138 classifies both a known and unknown object in the same image. For example, if the multiclass classifier 138 classifies a vehicle as a known vehicle and a person and as an unknown person, the system can determine to keep the front door 108 locked.

In some implementations, generating a multiclass classifier can include using the first set of images as positive examples and the second set of images from the images of unknown persons as negative examples.

In some implementations, the process 200 can include additional steps, fewer steps, or some of the steps can be divided into multiple steps. For example, the training data generator 134 can obtain images of the multiple unknown objects. Selecting the second set of images can include selecting the second set of images from the images.

In some implementations, the server 120 can provide the multiclass classifier 138 to a device for use in classifying objects as known objects. In such implementations, the multiclass classifier 138 can receive an image of an object and classify the object as a known object or unknown object. In response to the multiclass classifier 138 classifying the object as a known object or unknown object, the system 100 can perform an automated action for known objects or unknown objects, respectively. For example, the system 100 can open a door to the property 105 if the multiclass classifier 138 classifies the object as a known object, e.g., one of residents A-C.

Figure 3:
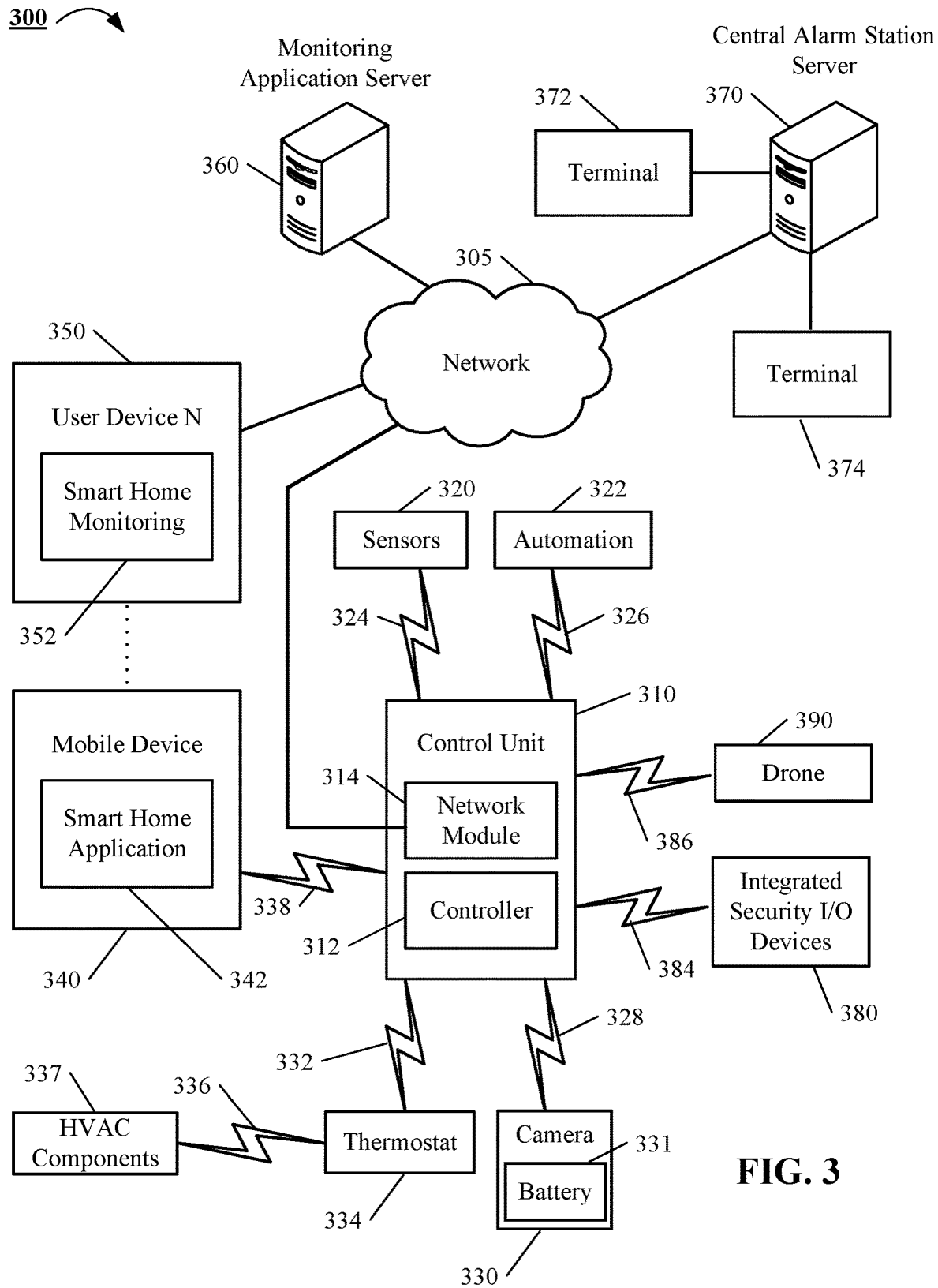
FIG. 3 is a diagram illustrating an example of a home monitoring system.

FIG. 3 is a diagram illustrating an example of a home monitoring system 300. The electronic system 300 includes a network 305, a control unit 310, one or more user devices 340 and 350, a monitoring application server 360, and a central alarm station server 370. In some examples, the network 305 facilitates communications between the control unit 310, the one or more user devices 340 and 350, the monitoring application server 360, and the central alarm station server 370. In some implementations, the central alarm station server 370 may correspond to the server 120, the user device 350 may correspond to the user device 140, and the camera 330 may correspond to the camera 106. In some implementations, the control unit 310 may correspond to the server 120.

The network 305 is configured to enable exchange of electronic communications between devices connected to the network 305. For example, the network 305 may be configured to enable exchange of electronic communications between the control unit 310, the one or more user devices 340 and 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voiceband modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The control unit 310 communicates with the module 322 and the camera 330 to perform monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol. Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the control unit 310. For instance, the module 322 may cause a lighting system to illuminate an area to provide a better image of the area when captured by a camera 330. The camera 330 can include one or more batteries 331 that require charging. A drone 390 can be used to survey the electronic system 300. In particular, the drone 390 can capture images of each item found in the electronic system 300 and provide images to the control unit 310 for further processing. Alternatively, the drone 390 can process the images to determine an identification of the items found in the electronic system 300.

The camera 330 may be a video/photographic camera or other type of optical sensing device configured to capture images. For instance, the camera 330 may be configured to capture images of an area within a building or within a residential property 102 monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the control unit 310 and the camera 330 receives commands related to operation from the monitoring application server 360.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a property and/or environmental data at a property, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy-monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334.

A module 337 is connected to one or more components of an HVAC system associated with a property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy-monitoring information and the state of the HVAC system components to the thermostat 334 and can control the one or more components of the HVAC system based on commands received from the thermostat 334.

In some examples, the system 300 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 300 for use in appropriate circumstances. For instance, a robotic vacuum cleaner device may be associated with the monitoring system 300 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 310, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 310. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 300. For instance, after completion of a monitoring operation or upon instruction by the control unit 310, the robotic devices may be configured to automatically fly to and land on one of the charging stations. In this regard, the robotic devices may automatically maintain a fully charged battery in a state in which the robotic devices are ready for use by the monitoring system 300.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices. Additionally, the one or more control units 310 may receive one or more sensor data from the sensors 320 and determine whether to provide an alert to the one or more integrated security input/output devices 380.

The sensors 320, the module 322, the camera 330, the thermostat 334, drone 390, and the integrated security devices 380 communicate with the controller 312 over communication links 324, 326, 328, 332, 384, and 386. The communication links 324, 326, 328, 332, 384, and 386 may be a wired or wireless data pathway configured to transmit signals from the sensors 320, the module 322, the camera 330, the thermostat 334, the drone 390, and the integrated security devices 380 to the controller 312. The sensors 320, the module 322, the camera 330, the thermostat 334, the drone 390, and the integrated security devices 380 may continuously transmit sensed values to the controller 312, periodically transmit sensed values to the controller 312, or transmit sensed values to the controller 312 in response to a change in a sensed value. In some implementations, the drone 390 can communicate with the monitoring application server 360 over network 305. The drone 390 can connect and communicate with the monitoring application server 360 using a Wi-Fi or a cellular connection.

The communication links 324, 326, 328, 332, 384, and 386 may include a local network. The sensors 320, the module 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 3 (CAT6) wired Ethernet network. The local network may be a mesh network constructed based on the devices connected to the mesh network.

The monitoring application server 360 is an electronic device configured to provide monitoring services by exchanging electronic communications with the control unit 310, the one or more user devices 340 and 350, and the central alarm station server 370 over the network 305. For example, the monitoring application server 360 may be configured to monitor events (e.g., alarm events) generated by the control unit 310. In this example, the monitoring application server 360 may exchange electronic communications with the network module 314 included in the control unit 310 to receive information regarding events (e.g., alerts) detected by the control unit server 104a. The monitoring application server 360 also may receive information regarding events (e.g., alerts) from the one or more user devices 340 and 350.

In some examples, the monitoring application server 360 may route alert data received from the network module 314 or the one or more user devices 340 and 350 to the central alarm station server 370. For example, the monitoring application server 360 may transmit the alert data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the control unit 310 or the one or more user devices 340 and 350.

The central alarm station server 370 is an electronic device configured to provide alarm monitoring service by exchanging communications with the control unit 310, the one or more mobile devices, e.g., user devices 340 and 350, and the monitoring application server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices, e.g., user devices 340 and 350 and/or the monitoring application server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more user devices 340 and 350 are devices that host and display user interfaces. For instance, the user device 340 is a mobile device that hosts one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the control unit 310 over the network 305. The user device 350 may be configured to display a smart home user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Zwave, Zigbee, HomePlug (ethernet over power-line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring application server 360 may relay data received from the control unit 310 to the one or more user devices 340 and 350 through the network 305. In this regard, the monitoring application server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through communication link 338) or through the monitoring application server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring application server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 only includes the one or more user devices 340 and 350, the sensors 320, the module 322, the camera 330, and the robotic devices. The one or more user devices 340 and 350 receive data directly from the sensors 320, the module 322, the camera 330, and the robotic devices and sends data directly to the sensors 320, the module 322, the camera 330, and the robotic devices. The one or more user devices 340, 350 provide the appropriate interfaces/processing to provide visual surveillance and reporting.

In other implementations, the system 300 further includes network 305 and the sensors 320, the module 322, the camera 330, the thermostat 334, and the robotic devices are configured to communicate sensor and image data to the one or more user devices 340 and 350 over network 305 (e.g., the Internet, cellular network, etc.). In yet another implementation, the sensors 320, the module 322, the camera 330, the thermostat 334, and the robotic devices (or a component, such as a bridge/router) are intelligent enough to change the communication pathway from a direct local pathway when the one or more user devices 340 and 350 are in close physical proximity to the sensors 320, the module 322, the camera 330, the thermostat 334, and the robotic devices to a pathway over network 305 when the one or more user devices 340 and 350 are farther from the sensors 320, the module 322, the camera 330, the thermostat 334, and the robotic devices. In some examples, the system leverages GPS information from the one or more user devices 340 and 350 to determine whether the one or more user devices 340 and 350 are close enough to the sensors 320, the module 322, the camera 330, the thermostat 334, and the robotic devices to use the direct local pathway or whether the one or more user devices 340 and 350 are far enough from the sensors 320, the module 322, the camera 330, the thermostat 334, and the robotic devices that the pathway over network 305 is required. In other examples, the system leverages status communications (e.g., pinging) between the one or more user devices 340 and 350 and the sensors 320, the module 322, the camera 330, the thermostat 334, and the robotic devices to determine whether communication using the direct local pathway is possible. If communication using the direct local pathway is possible, the one or more user devices 340 and 350 communicate with the sensors 320, the module 322, the camera 330, the thermostat 334, and the robotic devices using the direct local pathway. If communication using the direct local pathway is not possible, the one or more user devices 340 and 350 communicate with the sensors 320, the module 322, the camera 330, the thermostat 334, and the robotic devices using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer implemented method, comprising:
obtaining a first set of images of one or more objects, each of which has a likelihood of being at a property that satisfies a likelihood threshold;
generating, for each object from the one or more objects each of which has a likelihood of being at a property that satisfies a likelihood threshold, a binary classifier from a set of images of the respective object that outputs a binary value indicating whether an image depicting an object satisfies a corresponding criterion that is specific to the binary classifier, the generating comprising generating two or more binary classifiers that a) are each for an object classification and b) indicate whether a corresponding image satisfies a different corresponding criterion for the corresponding object classification;
determining, using at least one of the binary classifiers, that an image of an unknown object of a plurality of unknown objects was classified as an object from the one or more objects each of which has the respective likelihood of being at the property that satisfies the likelihood threshold;
in response to determining, using at least one of the binary classifiers, that the image of the unknown object of the plurality of unknown objects was classified as an object from the one or more objects each of which has the respective likelihood of being at the property that satisfies the likelihood threshold, selecting a second set of images of the unknown objects from the plurality of unknown objects that does not include the image; and generating a multiclass classifier that outputs a non-binary value indicating whether an image depicting another object satisfies one of a plurality of criterion to classify objects depicted in images of the property using i) the first set of images of the one or more objects as respective classes and ii) the second set of images of the unknown objects that does not include the image.

2. The method of claim 1, wherein selecting the second set of images comprises selecting the second set of images of the unknown objects from the plurality of unknown objects that does not include any images of the object.

3. The method of claim 1, wherein the one or more objects each of which has a likelihood of being at a property comprise one or more residents.

4. The method of claim 1, further comprising obtaining images of the plurality of unknown objects, wherein selecting the second set of images comprises selecting the second set of images from the images.

5. The method of claim 1, wherein generating a multiclass classifier further comprises using the first set of images as positive examples and the second set of images from the images of unknown objects as negative examples.

6. The method of claim 1, wherein the one or more objects comprises at least one of one or more people, one or more animals, or one or more vehicles.

7. The method of claim 1, further comprising providing the multiclass classifier to a device for use in classifying objects as known objects.

8. The method of claim 1, further comprising:
receiving an image of an object;
classifying, using a multiclass classifier that was trained to classify objects as known or unknown objects with i) a first set of images of one or more known objects each of which has a) a likelihood of being at the property that satisfies the threshold likelihood and b) a binary classifier that indicates whether an image likely depicts the respective known object and ii) a second set of images of the unknown objects that does not include an image that was classified by one of the one or more binary classifiers as likely depicting a respective known object, the object as a known object or unknown object; and
in response to classifying the object as a known object or unknown object, performing an automated action for known objects or unknown objects, respectively.

9. The method of claim 1, further comprising:
validating at least one of the binary classifiers by determining at least one false positive within the positive sample from a confusion matrix for the at least one binary classifier;
updating the first set of images by removing the at least one false positive from the first set of images; and
generating a new multiclass classifier using i) the updated, first set of images of the one or more objects as respective classes and ii) the second set of images of the unknown objects that does not include the image.

10. The method of claim 1, wherein the plurality of unknown objects comprise objects for which a binary classifier is not associated at the property.

11. A system comprising one or more computers and one or more storage devices on which are stored instructions that are operable, when executed by the one or more computers, to cause the one or more computers to perform operations comprising:

obtaining a first set of images of one or more objects, each of which has a likelihood of being at a property that satisfies a likelihood threshold;

generating, for each object from the one or more objects each of which has a likelihood of being at a property that satisfies a likelihood threshold, a binary classifier from a set of images of the respective object that outputs a binary value indicating whether an image depicting an object satisfies a corresponding criterion that is specific to the binary classifier, the generating comprising generating two or more binary classifiers that a) are each for an object classification and b) indicate whether a corresponding image satisfies a different corresponding criterion for the corresponding object classification;

determining, using at least one of the binary classifiers, that an image of an unknown object of a plurality of unknown objects was classified as an object from the one or more objects each of which has the respective likelihood of being at the property that satisfies the likelihood threshold;

in response to determining, using at least one of the binary classifiers, that the image of the unknown object of the plurality of unknown objects was classified as an object from the one or more objects each of which has the respective likelihood of being at the property that satisfies the likelihood threshold, selecting a second set of images of unknown objects from the plurality of unknown objects that does not include the image; and generating a multiclass classifier that outputs a non-binary value indicating whether an image depicting another object satisfies one of a plurality of criterion to classify objects depicted in images of the property using i) the first set of images of the one or more objects as respective classes and ii) the second set of images of the unknown objects that does not include the image.

12. The system of claim 11, wherein selecting the second set of images comprises selecting the second set of images of the unknown objects from the plurality of unknown objects that does not include any images of the object.

13. The system of claim 11, wherein the one or more objects each of which has a likelihood of being at a property comprise one or more residents.

14. The system of claim 11, the operations further comprising obtaining images of the plurality of unknown objects, wherein selecting the second set of images comprises selecting the second set of images from the images.

15. The system of claim 11, wherein generating a multiclass classifier further comprises using the first set of images as positive examples and the second set of images from the images of unknown objects as negative examples.

16. The system of claim 11, wherein the one or more objects comprises at least one of one or more people, one or more animals, or one or more vehicles.

17. The system of claim 11, the operations further comprising providing the multiclass classifier to a device for use in classifying objects as known objects.

18. The system of claim 11, the operations further comprising:
receiving an image of an object;
classifying, using a multiclass classifier that was trained to classify objects as known or unknown objects with i) a first set of images of one or more known objects each of which has a) a likelihood of being at the property that satisfies the threshold likelihood and b) a binary classifier that indicates whether an image likely depicts the respective known object and ii) a second set of images of the unknown objects that does not include an image that was classified by one of the one or more binary classifiers as likely depicting a respective known object, the object as a known object or unknown object; and in response to classifying the object as a known object or unknown object, performing an automated action for known objects or unknown objects, respectively.

19. The system of claim 11, the operations further comprising:

validating at least one of the binary classifiers by determining at least one false positive within the positive sample from a confusion matrix for the at least one binary classifier;

updating the first set of images by removing the at least one false positive from the first set of images; and generating a new multiclass classifier using i) the updated, first set of images of one or more objects as respective classes and ii) the second set of images of the unknown objects that does not include the image.

20. A non-transitory computer storage medium encoded with instructions that, when executed by one or more computers, cause the one or more computers to perform operations comprising:

obtaining a first set of images of one or more objects, each of which has a likelihood of being at a property that satisfies a likelihood threshold;

generating, for each object from the one or more objects each of which has a likelihood of being at a property that satisfies a likelihood threshold, a binary classifier from a set of images of the respective object that outputs a binary value indicating whether an image depicting an object satisfies a corresponding criterion that is specific to the binary classifier, the generating comprising generating two or more binary classifiers that a) are each for an object classification and b) indicate whether a corresponding image satisfies a different corresponding criterion for the corresponding object classification;

determining, using at least one of the binary classifiers, that an image of an unknown object of a plurality of unknown objects was classified as an object from the one or more objects each of which has the respective likelihood of being at the property that satisfies the likelihood threshold;

in response to determining, using at least one of the binary classifiers, that the image of the unknown object of the plurality of unknown objects was classified as an object from the one or more objects each of which has the respective likelihood of being at the property that satisfies the likelihood threshold, selecting a second set of images of unknown objects from the plurality of unknown objects that does not include the image; and generating a multiclass classifier that outputs a non-binary value indicating whether an image depicting another object satisfies one of a plurality of criterion to classify depicted in images of the property using i) the first set of images of the one or more objects as respective classes and ii) the second set of images of the unknown objects that does not include the image.

* * * * *

UNITED STATES PATENT AND TRADEMARK OFFICE
CERTIFICATE OF CORRECTION

PATENT NO. : 12,340,559 B2
APPLICATION NO. : 17/903484
DATED : June 24, 2025
INVENTOR(S) : Yuanwei Wu et al.

Page 1 of 1

It is certified that error appears in the above-identified patent and that said Letters Patent is hereby corrected as shown below:

In the Claims

Column 26, Line 28, before "depicted" insert --objects--.

Signed and Sealed this
Twenty-third Day of September, 2025

John A. Squires
*Director of the United States Patent and Trademark Office*